UNITED STATES PATENT OFFICE.

SAMUEL W. HALEY, OF BROOKLYN, NEW YORK, ASSIGNOR OF ONE-HALF OF HIS RIGHT TO WILLIAM D. BOWERMAN.

PHOSPHATED NUTRITIVE POWDER.

SPECIFICATION forming part of Letters Patent No. 230,415, dated July 27, 1880.

Application filed March 17, 1880. (Specimens.)

*To all whom it may concern:*

Be it known that I, SAMUEL W. HALEY, of Brooklyn, Kings county, and State of New York, have invented a new and useful Phosphorized Nutritive Compound; and I do hereby declare the following specification to be a full, clear, and exact description thereof.

My invention relates to precipitating, phosphorizing, and enriching caseine and albumen in milk.

The invention consists in separating, phosphorizing, and enriching the caseine and albumen, or the nitrogenous matter in milk, by the use of monobasic phosphoric acid, and in freeing the precipitate from the uncombined acid by repeated applications of fresh water; after which the neutral precipitate is desiccated, and still further enriched by adding alkaline salts and farinaceous substances.

The method of preparing the phosphorized nutritive compound is as follows: First, I take one gallon of milk and raise the temperature to a suitable degree of heat, or near the boiling-point, and while stirring it in a proper vessel I gradually add forty grains, or thereabout, of monobasic phosphoric acid, previously dissolved in water, which combines with and phosphorizes and separates the caseine and albumen from the whey or watery elements in milk; after which I immediately and preferably add the coldest water available, and stir the mass until it breaks up the coagulum; after which I place the plastic granules upon a suitable filter and press out the moisture.

For immediate use these plastic granules can be further enriched by combining with the following mixture and in about the following proportions: one ounce of phosphate of soda, from twenty to forty grains of carbonate of soda, three drams of salt, and about four ounces of flour.

When the nutritive compound is to be kept for a long time it must be spread out upon drying-pans or other suitable drying-surfaces, and sufficiently heated to evaporate the moisture therefrom; after which the desiccated compound is pulverized and sifted, or, as in milling, by grinding and bolting; after which it is ready for transportation and use.

I also reclaim the soluble lactine by filtering the whey through bone-charcoal, and when crystallized I pulverize and add it to the composition mixture, which renders the insoluble caseine and albumen soluble and digestible, while the action of the efflorescent and antiseptic salts prohibits deliquescence and oxidation in the open air.

I also vary the proportions of the nutritive compound to suit varying requirements.

I have also used other phosphoric acid and biacid salts for separating caseine and albumen from milk which has been heated at varying temperatures; but as the monobasic phosphoric acid is normally used in the living organism to condense fibrin, albumen, and caseine in the formation of tissues, it is therefore preferably used as a precipitant for precipitating caseine and albumen from milk.

I also use sour and butter milk, when available, from which good results are obtained.

What I claim, and desire to secure by Letters Patent, is—

1. The process of preparing an improved nutritive compound from milk, consisting in first precipitating the caseine and albumen by monobasic phosphoric acid, washing the soluble matter therefrom and drying the curd; second, in adding to the dried mass tribasic phosphate of soda, salt, bicarbonate of soda, and flour.

2. As a new article of manufacture, the herein-described phosphorized nutritive compound, consisting of caseine and albumen precipitated from milk by monobasic phosphoric acid, and combined with tribasic phosphate of soda, salt, bicarbonate of soda, and flour.

SAMUEL W. HALEY.

Witnesses:
H. A. KIRCHNER,
J. W. WALTERS.